US006602582B2

(12) United States Patent
Winterowd
(10) Patent No.: US 6,602,582 B2
(45) Date of Patent: Aug. 5, 2003

(54) COLORLESS EDGE SEALANT FOR WOOD-BASED PANELS

(75) Inventor: Jack G. Winterowd, Puyallup, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 09/921,343

(22) Filed: Aug. 1, 2001

(65) Prior Publication Data

US 2003/0026954 A1 Feb. 6, 2003

(51) Int. Cl.[7] .................................................. B32B 3/08

(52) U.S. Cl. .................... 428/192; 428/195; 428/537.1; 428/690

(58) Field of Search ................................ 428/192, 195, 428/537.1, 690

(56) References Cited

U.S. PATENT DOCUMENTS

| | | | |
|---|---|---|---|
| 4,021,398 A | | 5/1977 | Gilman et al. |
| 4,218,516 A | | 8/1980 | Meyer et al. |
| 4,317,755 A | | 3/1982 | Gregory |
| 4,683,260 A | | 7/1987 | Wickert |
| 4,722,953 A | | 2/1988 | DeRuiter et al. |
| 4,897,291 A | | 1/1990 | Kim |
| 5,308,694 A | | 5/1994 | Andersson |
| 5,312,863 A | | 5/1994 | Van Rheenen et al. |
| 5,320,872 A | | 6/1994 | McNeel et al. |
| 5,460,644 A | | 10/1995 | Thomassen |
| 5,529,811 A | | 6/1996 | Sinko |
| 5,891,294 A | | 4/1999 | Shih et al. |
| 5,993,534 A | | 11/1999 | Winterowd et al. |
| 6,207,290 B1 | * | 3/2001 | Blum et al. ................. 428/195 |

OTHER PUBLICATIONS

Fracheboud, M. et al., "New Sesquiterpenes From Yellow Wood of Slippery Ekm," *Forest Prod. J. 18*(2):37–40, Feb. 1968.

* cited by examiner

*Primary Examiner*—Alexander S. Thomas
(74) *Attorney, Agent, or Firm*—Christensen O'Connor Johnson Kindness PLLC

(57) ABSTRACT

The present invention provides a formulation for treating the edge of a wood-based panel. The formulation includes an optical brightener and optional amine such that the treated edge fluoresces when illuminated with ultraviolet light. Wood-based panels treated with the sealant, and methods for making and applying the formulation to a wood-based panel are also provided.

18 Claims, No Drawings

COLORLESS EDGE SEALANT FOR WOOD-BASED PANELS

FIELD OF THE INVENTION

The present invention relates to an edge sealant for wood-based panels and, more particularly, to a colorless edge sealant that fluoresces when illuminated by ultraviolet light.

BACKGROUND OF THE INVENTION

Wooden panels, such as oriented strandboard (OSB) or plywood, are commonly used as subfloor sheathing in residential homes. These panels are installed directly on top of floor joists prior to installation of the walls and roof of the structure. Thus, the subfloor is exposed to external environmental conditions for a period of time during the general process of building a house. It is common for the subfloor panels to be subjected to rain during this process. Sill plates, which vertically protrude from the perimeter of the floor, can literally convert the floor into a basin. An uncovered subfloor can accumulate as much as two inches of water during a rainstorm. In some cases the accumulated water will be left to absorb into the subfloor panels for several days during the home-building process.

Subfloors comprised of plywood generally undergo relatively little dimensional change when subjected to rain. Unfortunately, most OSB panels undergo irreversible thickness swell when exposed to rain. OSB flooring panels, which are manufactured at a thickness of 720 mils (0.720 inch), can actually swell to edge thickness values in excess of 1000 mils. Upon drying, these same OSB panels can have an edge thickness of 900 mils. Thus, much of the edge thickness swelling action is not reversible. The worst aspect of this swelling behavior is that OSB panels swell to a greater extent on the edge of the panel than they do in regions towards the center of the panels.

When edge swell occurs during residential home construction, it manifests itself as ridges along the seams in the subfloor. Builders are often required to sand the seams in the subfloor in order to remove these ridges and create a flat, smooth subfloor. Obviously, the practice of sanding the subfloor is costly, time-consuming and frustrating to the builder.

In order to inhibit edge swell, virtually all OSB manufacturers in North America apply a liquid, paint-like, aqueous, sealant formulation onto the edge of their panels. These edge sealant formulations are commercially supplied in North America by companies such as Associated Chemists Incorporated [Portland, Oreg.] and the Willamette Valley Company [Eugene, Oreg.]. Typically, the sealant is applied to the edge of OSB panels and dried to form a coating, which retards the absorption of water and helps to dimensionally stabilize the OSB in wet environments. The edge sealant also provides the function of visually differentiating distinct OSB panels in the marketplace. This is accomplished by incorporating colored pigments into the edge sealant formulation. Thus, the specific color of the edge sealant is commonly used as an identifying marker that allows a customer to easily determine the manufacturer of a given panel. An intensely colored edge sealant also makes it obvious to the consumer that the manufacturer has treated the panel edges. Builders (customers) have learned to associate an intensely colored panel edge with the presence of edge sealant and improved dimensional stability. Thus, one of the most important functions of an edge sealant is its obvious visibility subsequent to application and drying.

In North America, aqueous edge sealant formulations for OSB are generally comprised of latex, emulsified wax, and colorants. The most intense colorants are based on water-insoluble organic compounds. Incorporating these colorants into an aqueous matrix requires the use of additional surfactants in order to stabilize the total sealant formulation. Unfortunately, these same surfactants remain in the sealant formulation as it dries, and they severely detract from the ability of the applied edge sealant to repel water. Thus, a colorless edge sealant should be more water repellant than a colored one. The ability of colored and colorless edge sealant formulations to dimensionally stabilize wooden panels in a wet environment has been evaluated and it has been found that colorless edge sealant formulations perform significantly better than do the colored ones.

The application of colorless edge sealant formulations to aspen and poplar-based OSB panels results in a coating that is essentially colorless and transparent. Thus, the edge of the sealed OSB panel generally appears to be non-treated. Since most builders are accustomed to seeing the colored edge sealant, and they associate the color of it with the attribute of improved dimensional stability, an ironic dilemma arises in which the actual dimensional stability of the panel has been improved, but the builder perceives it as being inferior and might be unwilling to buy it. A second problem associated with the use of colorless edge sealant formulations occurs when the technology is applied to pine-based OSB as described below.

Application of several different colorless edge sealant formulations from three different suppliers were applied to the edge of a pine-based OSB panel. In each of these cases the edge of the treated panel spontaneously became yellow in color within about 5–15 minutes of sealant application. The intensity of the yellow color did seem to be correlated with particular colorless edge sealant formulations. In contrast, when colorless edge sealant was applied to aspen or poplar-based OSB, the edge of the panel retained the off-white color of the aspen wood. Thus, the colorless edge sealant could visually differentiate panels as a function of the wood species. This effect might be undesirable in certain circumstances. For instance, a company that is applying colorless edge sealant at several OSB mills, which use different wood species as furnish, might be required to sell OSB in the marketplace that is generally similar, but different in color as a function of the wood species in the OSB. This company might then be perceived as having poor standardization in the marketplace. Also, other companies in the industry might already be selling an OSB panel with a yellow-colored edge. This would make it more difficult to distinguish between the different brands of OSB. In some cases another company might have even trademarked a yellow colored OSB.

Discoloration of various decorative materials, which are applied to wooden objects, has been reported in the past. For instance, coatings and white plastic coverings are known to become yellow in color subsequent to application on elm wood [see Fracheboud, M.; et al., (1968) "New sesquiterpenes from yellow wood of slippery elm", *Forest Prod. J.:* 18(2), p 37–40]. Vinyl flooring can become discolored over a period of time when applied to various wooden flooring products (see, for example, Anderson, T. (1994) "Barrier layer for floor and wall coverings", U.S. Pat. No. 5,308,694; Shih, K. S.; et al. (1999) "Stain-blocking barrier layer", U.S. Pat. No. 5,891,294; and Winterowd, J. G.; et al., (1999) "Stain blocking treatments for wood based panels", U.S. Pat. No. 5,993,534). The application of many alkaline aqueous colorless solutions to pine species of wood results in yellow discoloration of the wood.

Methods involving the application of primers to wood in order to prevent it from discoloring latex paint are well known. Some of these primer technologies are described in, for example, Gilman, W. S.; et al. (1977) "Aqueous latex emulsions containing basic aluminum compounds of wood stain reducing agents", U.S. Pat. No. 4,021,398; Meyer, V. E.; et al. (1980) "Pigment for blocking tannin migration", U.S. Pat. No. 4,218,516; McNeel, T. E.; et al. (1994) "Method for the reduction or prevention of tannin-staining on a surface susceptible to tannin-staining through the use of a complexing agent for a transition metal ion and compositions containing such a complexing agent", U.S. Pat. No. 5,320,872; Van Rheenen, P. R.; et al. (1994) "Cationic latex coatings", U.S. Pat. No. 5,312,863; Thomassen, I. P. (1995) "Stain-blocking and mildewcide resistant coating compositions", U.S. Pat. No. 5,460,644; and Sinko, J. (1996) "Tannin staining and fungus growth inhibitor pigment and manufacturing procedure", U.S. Pat. No. 5,529,811. Examples of commercially available primer formulations include White Pigmented Kilz (Masterchem Industries Barnhart, Mo.) and Bulls Eye Amber Shellac (William Zinsser & Company Incorporated, Somerset, N.J.). Unfortunately, these technologies would be expensive, overly complicating in the traditional OSB finishing process, and have the potential of compromising the dimensional stabilizing effect of the edge sealant.

Accordingly, there exists a need for a colorless edge sealant that generally performs significantly better than that of most colored edge sealant formulations, while simultaneously avoiding the problems of:

(a) customers being unable to visually detect the presence of the colorless edge sealant when it is applied to aspen or poplar-based OSB; and (b) the edge sealant becoming yellow in color when applied to pine-based OSB.

The present invention seeks to fulfill these needs and provides further related advantages.

SUMMARY OF THE INVENTION

In one aspect, the present invention provides a composition for treating the edge of a wood-based panel. The composition is a colorless edge sealant that includes an optical brightener. The optical brightener acts as a latent visual marker that can be observed by exposure to ultraviolet light. The composition can optionally include an amine that is effective in preventing the sealant from becoming yellow in color subsequent to application to pine-based OSB. In one embodiment, a stable, single-component, liquid, additive formulation that contains an optical brightener and amine is provided. The additive formulation (i.e., optical brightener and optional amine) can be conveniently added to a colorless edge sealant formulation to form a liquid mixture that can be sprayed or otherwise applied onto the edge of wood-based panels and dried to yield a coating which substantially improves the dimensional stability of the panel in wet environments. The dried coating appears to be generally colorless and transparent when in visible light, but is fluorescent when exposed to ultraviolet light.

In another aspect, the invention provides a wood-based panel that has been treated with a colorless edge sealant that includes an optical brightener and optional amine.

One advantage of the edge sealant of the invention is that the optical brightener component provides a visual marker that allows salesmen of wooden panels to demonstrate the presence of the colorless edge sealant to prospective buyers.

In other aspects, methods for making the edge sealant composition and methods for applying the composition to wood-based panels are also provided.

DETAILED DESCRIPTION OF THE PREFERRED EMBODIMENT

The present invention provides a composition for treating the edge of a wood-based panel. The composition is a colorless edge sealant that includes an optical brightener. In one embodiment, the colorless edge sealant includes an optical brightener and an amine. The optical brightener is a fluorescent material that can be visually observed on illumination with ultraviolet light. The amine is effective in preventing the sealant from yellowing.

There are many potential avenues and applications of this invention. Included among these are the use of an optical brightener (also known as a fluorescent whitening agent) and optional amine in a colorless edge sealant for wood-based panels. Typically, the colorless sealant composition of the invention is applied to the edge of a wooden panel at a wet spread rate of 10–50 lbs. per 1000 $ft^2$ of the panel edge surface. In general, the optical brightener is present in the sealant at a level of from about 0.0001 to about 5 percent by weight and the amine, when included, is present in the sealant at a level of up to about 2 percent by weight based on the total weight of composition. Salesmen will be able to demonstrate the presence of the colorless edge sealant by exposing the sealant to ultraviolet light, which will cause the optical brightener in the colorless sealant to fluoresce dramatically. Suitable light sources for observing the fluorescence of wood-based panels treated in accordance with the present invention include portable ultraviolet light sources, such as the Pocket-Size Light (catalog #6760T11), or the 12V Light (catalog #8519T16), which emit light at a wavelength of 365 nm and are distributed by the McMaster-Carr Supply Company, Los Angeles, Calif.

The optical brightener useful in this invention include those that are soluble in either water or organic solvents. The selection of optical brightener type should be partially based upon where it is most convenient to perturb the conventional aqueous edge sealant manufacturing process. Suitable optical brighteners are described below.

In the general process of manufacturing edge sealants, petroleum-derived slack wax or paraffin wax is melted and emulsified in water at elevated temperature. The resulting wax emulsion is then cooled and combined with an aqueous latex and other additives.

In some circumstances it might be desirable to dissolve an optical brightener in the molten wax just prior to emulsification. Alternatively, one might prefer to dissolve the optical brightener in an aliphatic solvent and then add this organic optical brightener solution to either the molten wax or the wax emulsion. The optical brightener solution should be stable at temperatures of at least 60° C. for this particular avenue of the invention. An example of a suitable optical brightener that is not water-soluble is 2,5-thiophenediylbis(5-tert-butyl-1,3-benzoxazole), which is commercially available from Ciba Specialty Chemicals Corporation, High Point, N.C., under the designation UVITEX OB. UVITEX OB is soluble in aliphatic solvents, has a high fluorescence efficiency (effective at concentrations of about 0.001%), is relatively stable to light and elevated temperature, and is relatively non-toxic. Other types of water-insoluble optical brighteners that are suitable for this invention include the 2-(stilben-4-yl)naphthotriazoles, 1,4-bisstyrylbenzenes, bis(benzoxazol-2-yl) derivatives, coumarins, carbostyrils, and naphthalimides. Mixtures of optical brighteners can also be used.

In some cases a company that wishes to practice this technology might not have direct control over the wax emulsification process. These companies might find it advantageous to use a water-soluble optical brightener. This aspect of the technology can generally be practiced by dissolving an optical brightener in water and introducing this aqueous optical brightener solution into the edge sealant at some stage subsequent to the wax emulsification process. One water-soluble optical brightener is disodium distyrylbiphenyl disulfonate, which is commercially available from the Ciba Specialty Chemicals Corporation, High Point, N.C., under the designation TINOPAL CBS-X. TINOPAL CBS-X associates strongly with cellulosic materials, has a high fluorescence efficiency (effective at concentrations of about 0.1%), is relatively stable to degradation when exposed to light and elevated temperature, does not destabilize the colorless edge sealant, and is relatively non-toxic. Other types of water soluble optical brighteners that are suitable for this invention include bistriazinyl derivatives of 4,4'-diaminostilbene-2,2'-disulfonic acid, sulfonated 2-(stilben-4-yl)naphthotriazoles, bis(azol-2-yl)stilbenes, bisstyrylbiphenyl disodium salt, and sulfonated pyrazolines. Mixtures of optical brighteners can also be used.

Regardless of its solubility, the optical brightener is present in the composition at a level that imparts a visually apparent fluorescent affect when the applied colorless edge sealant on the wooden panel is exposed to ultraviolet light. The level of optical brightener in the sealant can range from about 0.0001 to about 5 percent by weight based on the total weight of the composition. In one embodiment, the amount of optical brightener in the sealant is from about 0.01 to about 0.1 percent by weight based on the total weight of the composition.

Amines that are useful in the composition are effective in preventing sealant yellowing. Suitable amines include hydroxylamine, ethanolamine, and 4-(3-aminopropyl) morpholine. Mixtures of amines can also be used.

Hydroxylamine is routinely distributed globally as either a 50% hydroxylamine free-base aqueous solution or as acidified salts. Hydroxylamine free-base solution is a suitable hydroxylamine formulation for this invention. The exact level of hydroxylamine required to prevent the sealant from yellowing on pine-based OSB depends on the percentage of pine in the board, the sub-species of pine, as well as the age and environment during harvest. Other OSB manufacturing parameters might also influence the exact amount of hydroxylamine required. Nevertheless, the amount of hydroxylamine in the sealant will range from about 0 to about 2 percent by weight. In one embodiment, the amount of hydroxylamine in the sealant is from about 500 to about 3000 ppm.

Many amine additives other than hydroxylamine have been evaluated for their ability to prevent the yellowing of a conventional edge sealant subsequent to application to a pine-based OSB panel. Most failed to substantially inhibit the yellowing process that is typically observed. However, other suitable amines that are suitable for use in the invention include ethanolamine and 4-(3-aminopropyl) morpholine. For these embodiments, when the amine is present in the sealant at a level of from about 1 to about 3 percent by weight based on the total weight of the composition, most of the yellow color is prevented from developing. Unfortunately, pine-based OSB edges treated with mixtures of colorless sealant and either of these amines results in edges that have a reddish hue. Depending on an array of business factors, the reddish hue may or may not be acceptable for a commercial application. In contrast, the use of hydroxylamine as an additive results in edges that have essentially the same color as an untreated edge.

Many companies that produce OSB purchase large volumes of edge sealant, but have little or no influence on the methods or materials used to produce the edge sealant. These OSB manufacturers can practice the invention by obtaining an aqueous additive formulation that includes the optical brightener and optional amine as described herein. This additive formulation can be used to supplement batches of colorless edge sealant at their OSB manufacturing sites. Other components of the additive formulation that may be useful include one or more of an alkaline stabilizing agent, a preservative, or any additive that is commonly used to prepare water-based formulations. In one embodiment, the additive formulation includes water (from about 5.0 to about 99.9%), a water-soluble optical brightener (from about 0.1 to about 4.0%), a preservative (from about 0 to about 1.0%), an alkaline stabilizing agent (from about 0 to about 10%), and an aqueous 50% hydroxylamine free-base solution (from about 0 to about 80%). In another embodiment, the additive formulation includes water (from about 70 to about 80%), a water-soluble optical brightener (from about 1.0 to about 3.0%), a preservative (from about 0.1 to about 0.2%), an alkaline stabilizing agent (from about 1 to about 3%), and an aqueous 50% hydroxylamine free-base solution (from about 10 to about 30%). Suitable colorless edge sealant compositions include a mixture of the additive formulation (from about 0.2 to about 10%) and a conventional, unmodified colorless edge sealant (from about 90 to about 99.8%).

The following examples are provided for the purpose of illustrating, not limiting the invention.

EXAMPLE 1

Representative Edge Sealant Composition and Treated Panel: Disodium Distyrylbiphenyl Disulfonate In this example, the preparation of a representative colorless edge sealant composition and wood-based panel treated with the sealant is described. In this example, the optical brightener is disodium distyrylbiphenyl disulfonate.

A stable wax/oil emulsion known as WA200M was prepared in the following manner. Water (70° C.; 53.81 parts by weight) was combined with a hydroxyethylcellulose powder known as Natrosol 250 MBR from Hercules Incorporated [Hopewell, Va.] (0.60 parts by weight) in a primary low-shear mixing vessel. The components were agitated for 20 minutes and the temperature of the mixture was maintained at 60–70° C. Triethanolamine (0.15 parts by weight) and morpholine (0.30 parts by weight) were added to the primary low-shear mixing vessel, and the entire mixture was agitated for 3 minutes. The temperature at the end of this step was 60–70° C. A preservative known as Dowicil 75 from Dow Chemical Incorporated [Midland, Mich.] (0.14 parts by weight) was added to the primary low-shear mixing vessel, and the entire mixture was agitated for 3 minutes. The temperature at the end of this step was 60–70° C. A hot wax/oil mixture (65° C.; 45.0 parts by weight) was added to the primary low-shear mixing vessel and the entire mixture was agitated for 3 more minutes. The mixture was then cycled through a high pressure 2-stage homogenizer (12,000 psi) for 20 minutes. The temperature at the end of this step was about 60° C.

The wax/oil mixture was prepared by combining R.B.D. grade soybean oil from Archer Daniels Midland [Redwing, Minn.] (80.18 parts by weight) with a mixture of long-chain fatty acids known as Pristerene 4910 from Uniquema [Chicago, Ill.] (13.33 parts by weight), a hydrogenated soybean oil known as Natura Shield ASW-220 from Archer Daniels Midland [Redwing, Minn.] (2.78 parts by weight), isostearyl alcohol from Uniquema [Chicago, Ill.] (0.28 parts by weight) and type 1230 paraffin wax from the International Group Incorporated [Wayne, Pa.] (5.56 parts by weight) in a secondary mixing vessel. The mixture of materials was stirred and heated until the temperature of the mixture was 80° C. The mixture was then checked to ensure that all of the components had melted and a single phase had been achieved. The temperature of the mixture was then decreased to 65° C.

The WA200M (20° C.; 59.38 parts by weight) was combined with water (20° C.; 11.25 parts by weight) in a mixing vessel and the mixture was agitated under low shear for 3 minutes. An aqueous 2% TINOPAL CBS-X (disodium distyrylbiphenyl disulfonate) from Ciba Specialty Chemicals Corporation [High Point, N.C.] solution (20° C.; 2.00 parts by weight) was added to the mixing vessel and the mixture was agitated under low shear for 3 minutes. An aqueous 6.5% sodium borate solution (20° C.; 9.38 parts by weight) was added to the mixing vessel and the mixture was agitated under low shear for 3 minutes. Acrygen latex 4096D from Omnova Solutions Incorporated [Fitchburg, Mass.] (20° C.; 18.00 parts by weight) was added to the mixing vessel and the mixture was agitated under low shear for 3 minutes.

The resulting colorless edge sealant was stable during storage at 20° C. for a period of at least 2 months. The sealant had a percent solids value of about 37%, a density of about 8.1 pounds/gallon, and a viscosity of about 2000 cps at 20° C. [Brookfield, #3 spindle at 20 rpm].

The colorless sealant was sprayed onto the square edges of OSB panel sections (12 inch×12 inch; 10 count) at a wet application level of 1.0 g/ft$^2$. The treated samples were conditioned for 16 h at 20° C. and 50% relative humidity. The sealed panel sections were submerged under water (1.0 inch; 20° C.) for a period of 48 hand then dried in an oven at a temperature of 85° C. for 24 h. Subsequent to the wet/redry cycle the treated OSB sections exhibited edge thickness swell values that were about 33% less than that of a corresponding set of control samples. The difference between the treated and untreated groups was statistically significant at a 99.9% confidence level.

The colorless sealant was sprayed onto the square edges of OSB panel sections at a wet application level of 1.0 g/ft$^2$. The treated samples were conditioned for 16 h at 20° C. and 50% relative humidity. The treated samples were exposed to visible light and examined. The presence of the colorless edge sealant in visible light was not apparent. The treated panel sections were placed in a dimly lit room and exposed to ultraviolet light from a portable light source. Under these conditions the edge of the panel sections fluoresced dramatically.

EXAMPLE 2

Representative Edge Sealant Composition and Treated Panel: Disodium Distyrylbiphenyl Disulfonate In this example, the preparation of a representative colorless edge sealant composition and wood-based panel treated with the sealant is described. In this example, the optical brightener is disodium distyrylbiphenyl disulfonate.

An additive formulation was prepared by dissolving TINOPAL CBS-X (disodium distyrylbiphenyl disulfonate) from Ciba Specialty Chemicals Corporation [High Point, N.C.] (2.0 parts by weight) in deionized water (98.0 parts by weight).

A modified colorless edge sealant formulation was prepared by combining the additive formulation (2.0 parts by weight) with a colorless edge sealant commercially available from Associated Chemists Incorporated [Portland, Oreg.] (98.0 parts by weight) under the designation PF6010-08.

The modified colorless edge sealant was stable during storage at 20° C. for a period of at least 2 months. The sealant had a percent solids value of about 39%, a density of about 8.1 pounds/gallon, and a viscosity of about 2000 cps at 20° C. [Brookfield, #3 spindle at 20 rpm].

The modified colorless sealant was sprayed onto the square edges of OSB panel sections (12 inch×12 inch; 10 count) [Weyerhaeuser Gold Single Layer Flooring manufactured in Edson, A B; black poplar furnish] at a wet application level of 1.0 g/ft. The treated samples were conditioned for 16 h at 20° C. and 50% relative humidity. The sealed panel sections were submerged under water (1.0 inch; 20° C.) for a period of 48 h and then dried in an oven at a temperature of 85° C. for 24 h. Subsequent to the wet/redry cycle the treated OSB sections exhibited edge thickness swell values that were about 36% less than that of a corresponding set of untreated control samples. In a similar procedure OSB sections that were treated with the conventional PF6010-08 sealant and subjected to the same wet/redry cycle exhibited edge thickness swell values that were about 34% less than that of the corresponding untreated control samples.

The modified colorless sealant was sprayed onto the square edges of OSB panel sections [Weyerhaeuser Gold Single Layer Flooring manufactured in Edson, A B; black poplar furnish] at a wet application level of 1.0 g/ft. The treated samples were conditioned for 16 h at 20° C. and 50% relative humidity. The treated samples were exposed to visible light and examined. The presence of the colorless edge sealant in visible light was not obvious. The treated panel sections were placed in a dimly lit room and exposed to ultraviolet light from a portable light source. Under these conditions the edge of the panel sections fluoresced dramatically.

The modified colorless sealant was sprayed onto the square edges of OSB panel sections at a wet application level of 1.0 g/ft$^2$. The treated samples were conditioned for 16 h at 20° C. and 50% relative humidity. The treated samples were exposed to visible light and examined. The presence of the colorless edge sealant in visible light was not obvious. The treated panel sections were placed in a dimly lit room and exposed to ultraviolet light from a portable light source. Under these conditions the edge of the panel sections fluoresced dramatically.

EXAMPLE 3

Representative Edge Sealant Composition and Treated Panel: Disodium Distyrylbiphenyl Disulfonate and Hydroxylamine In this example, the preparation of a representative colorless edge sealant composition and wood-based panel treated with the sealant is described. In this example, the optical brightener is disodium distyrylbiphenyl disulfonate. Hydroxylamine is included in this composition.

An additive formulation was prepared by dissolving TINOPAL CBS-X (disodium distyrylbiphenyl disulfonate) from Ciba Specialty Chemicals Corporation [High Point, N.C.] (2.0 parts by weight) in deionized water (75.8 parts by weight). A preservative, known as Dowicil 75 from Dow Chemical Incorporated [Midland, Mich.] (0.2 parts by weight) was added to the mixture with continued agitation until the mixture was homogenous. Triethanolamine (2.0 parts by weight) was added to the mixture with continued agitation until the mixture was homogenous. An aqueous 50% hydroxylamine free-base solution (20.0 parts by weight) was added to the mixture with continued agitation until the mixture was homogenous. This additive formulation was clear, yellow, very stable at 20° C. and had a viscosity of about 20 cps.

A modified colorless edge sealant formulation was prepared by combining the additive formulation described in example 3 (2.0 parts by weight) with a colorless edge sealant commercially available from Associated Chemists Incorporated (98.0 parts by weight) under the designation PF6010-08.

The modified colorless edge sealant was stable during storage at 20° C. for a period of at least 2 months, a percent solids value of about 39%, had a density of about 8.1 pounds/gallon, and a viscosity of about 2000 cps at 20° C. [Brookfield, #3 spindle at 20 rpm].

The modified colorless sealant was sprayed onto the square edges of OSB panel sections (12 inch×12 inch; 10 count) [Weyerhaeuser Gold Single Layer Flooring manufactured in Edson, A B; black poplar furnish] at a wet application level of 1.0 g/ft. The treated samples were conditioned for 16 h at 20° C. and 50% relative humidity. The sealed panel sections were submerged under water (1.0 inch; 20° C.) for a period of 48 h and then dried in an oven at a temperature of 85° C. for 24 h. Subsequent to the wet/redry cycle the treated OSB sections exhibited edge thickness swell values that were about 42% less than that of a corresponding set of untreated control samples. In a similar procedure OSB sections that were treated with the conventional PF6010-08 sealant and subjected to the same wet/redry cycle exhibited edge thickness swell values that were about 45% less than that of the corresponding untreated control samples.

The modified colorless sealant was sprayed onto the square edges of OSB panel sections at a wet application level of 1.0 g/ft$^2$. The treated samples were conditioned for 16 h at 20° C. and 50% relative humidity. The treated samples were exposed to visible light and examined. The presence of the colorless edge sealant in visible light was not apparent. The treated panel sections were placed in a dimly lit room and exposed to ultraviolet light from a portable light source. Under these conditions the edge of the panel sections fluoresced dramatically.

The modified colorless sealant was sprayed onto the square edges of OSB panel sections at a wet application level of 1.0 g/ft$^2$. The treated samples were conditioned for 16 h at 20° C. and 50% relative humidity. The treated samples were exposed to visible light and examined. The presence of the colorless edge sealant in visible light was not apparent. The treated panel sections were placed in a dimly lit room and exposed to ultraviolet light from a portable light source. Under these conditions the edge of the panel sections fluoresced dramatically.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A wood-based panel treated with a composition for reducing edge swelling, the panel having first and second major surfaces and four edge surfaces, the edge surfaces being treated with the composition, wherein the composition comprises hydroxylamine and disodium distyrylbiphenyl disulfonate.

2. The panel of claim 1, wherein the panel is oriented strandboard.

3. The panel of claim 1, wherein the panel is a pine-based oriented strandboard.

4. The panel of claim 1, wherein the panel is an aspen-based oriented strandboard.

5. The panel of claim 1, wherein the panel is a poplar-based oriented strandboard.

6. The panel of claim 1, wherein the composition is applied at a wet spread rate of about 10–50 lbs. per 1000 ft$^2$.

7. The panel of claim 1, wherein the composition includes from about 0.0001 to about 5 percent by weight disodium distyrylbiphenyl disulfonate.

8. The panel of claim 1, wherein the composition includes from about 0.01 to about 0.1 percent by weight disodium distyrylbiphenyl disulfonate.

9. The panel of claim 1, wherein the composition includes up to about 2 percent by weight hydroxylamine.

10. A wood-based panel treated with a composition for reducing edge swelling, the panel having first and second major surfaces and four edge surfaces, the edge surfaces being treated with the composition, wherein the composition comprises:

(a) disodium distyrylbiphenyl disulfonate; and (b) at least one of hydroxylamine, ethanolamine, or 4-(3-aminopropyl)morpholine.

11. The panel of claim 10, wherein the panel is oriented strandboard.

12. The panel of claim 10, wherein the panel is a pine-based oriented strandboard.

13. The panel of claim 10, wherein the panel is an aspen-based oriented strandboard.

14. The panel of claim 10, wherein the panel is a poplar-based oriented strandboard.

15. The panel of claim 10, wherein the composition is applied at a wet spread rate of about 10–50 lbs. per 1000 ft$^2$.

16. The panel of claim 10, wherein the composition includes from about 0.0001 to about 5 percent by weight disodium distyrylbiphenyl disulfonate.

17. The panel of claim 10, wherein the composition includes from about 0.01 to about 0.1 percent by weight disodium distyrylbiphenyl disulfonate.

18. The panel of claim 10, wherein the composition includes up to about 2 percent by weight of at least one of hydroxylamine, ethanolamine, or 4-(3-aminopropyl) morpholine.

* * * * *